United States Patent [19]

Porter et al.

[11] 3,889,418
[45] June 17, 1975

[54] HIGH DENSITY TREATMENT PRODUCT

[75] Inventors: Kenneth E. Porter, Mesa; Perry L. Nelson, Phoenix, both of Ariz.

[73] Assignee: American Bioculture, Inc., Plumsteadville, Pa.

[22] Filed: Apr. 25, 1974

[21] Appl. No.: 464,689

Related U.S. Application Data

[63] Continuation of Ser. No. 337,395, March 2, 1974, abandoned.

[52] U.S. Cl. .................. 47/58; 210/2; 47/DIG. 10; 47/1.4
[51] Int. Cl. ....................... C02c 1/00; A01h 13/00
[58] Field of Search ................. 47/1.4, 58, DIG. 10; 210/2, 11, 15

[56] References Cited
UNITED STATES PATENTS

| | | | |
|---|---|---|---|
| 2,866,296 | 12/1958 | Meadows | 47/58 |
| 2,867,945 | 1/1959 | Gotaas et al. | 47/1.4 |
| 3,431,675 | 3/1969 | Moore | 47/1.4 X |
| 3,444,647 | 5/1969 | Takahashi | 47/1.4 |
| 3,462,360 | 8/1969 | McKinney | 47/1.4 X |
| 3,546,812 | 12/1970 | Kobayashi et al. | 47/1.4 |
| 3,732,089 | 5/1973 | Megronigle | 47/1.4 X |

*Primary Examiner*—Robert E. Bagwill
*Attorney, Agent, or Firm*—Synnestvedt & Lechner

[57] ABSTRACT

Method of preparation and application of algal products is disclosed. By harvesting green algae, especially *Chlorella pyrenoidosa* during logarithmic phase of growth and after a cell density of $1 \times 10^5$ cells/ml is reached, a product having floccilating capability and plant growth regulating properties is obtained. Methods of handling this product and of application are disclosed.

10 Claims, No Drawings

HIGH DENSITY TREATMENT PRODUCT

This is a continuation, of application Ser. No. 337,395, filed Mar. 2, 1974 (now abandoned).

This invention relates to methods of preparation and of application of algae containing products.

In particular, the invention relates to the preparation of and treatment with algae containing products and algal by-products which products exhibit flocculating and growth promoting effects and are consequently useful in water and soil treatment applications and in various agricultural applications for the promotion of plant growth.

Algae containing treatment products are useful in a number of applications. For example, it has been observed that such substances aggregate soil, enhance its water penetration and retention properties, improve tilth and generally tend to promote conditions favorable to growth.

The invention provides improvement in methods for growing and harvesting green algae, preferably chlorella in order to maximize the production of bioflocculants. In accordance with another of its aspects, the invention also provides for the production of an algae product which exhibits certain growth regulating effects which beneficially promote seedling establishment and promote the growth of plants. Still another aspect of the invention involves techniques for applying products produced in accordance with the invention to the soil.

In summary, certain important objects of the invention are:

the product of algal production having improved soil and water treatment properties;

the provision of novel techniques for the treatment of soil; and the provision of novel techniques for growing algae, which techniques enhance the production of algal products having beneficial properties useful in the treatment of soils, water and organic waste materials.

How the foregoing and other objects of the invention are achieved will become more apparent from the following detailed embodiment of the invention.

Although certain beneficial effects of the invention are achieved utilizing other green algae, the preferred alga is the genus chlorella and preferably the species *Chlorella pyrenoidosa*. This species is a commonly occurring one and can be grown under a relatively broad range of environmental conditions. Considerable literature exists reporting on the growth of this species.

In carrying out the invention, cultures of *Chlorella pyrenoidosa* were grown in an aqueous medium to which was added nutrients suitable for growth. In the examples of the invention which follow, the nutrients are furnished by a serum which is a fermented extract of cow manure. This is of special advantage in carrying out the objects of the invention inasmuch as the nutrients are inherently balanced to favor the production of flocculating compounds. Moreover, it has been found that *Chlorella pyrenoidosa* is normally present in the serum, so that the serum acts as a seed material as well as a nutrient base for producing cultures according to the invention.

Although other methods of serum production may be used, reference is made to Wade U.S. Pat. No. 3,108,868 for a method of preparation of serum which is satisfactory for the purposes of this invention. The undiluted supernatent fluid of that patent is the material sometimes herein referred to as serum.

An analysis of serum of the type used shows the following composition:

| Total Phosphorus | mg/l | 35 |
| Total Phosphate | mg P/l | 29 |
| Orthophosphate | mg P/l | 18 |
| C.O.D. | mg O/l | 1580 |
| Total Kjeld. N | mg N/l | 488 |
| Ammonia | mg N/l | 380 |
| pH | | 9.0 |

A culture suitable for the purposes of the invention is prepared by adding one part of serum to about 20 parts of water. This mixture is allowed to stand for 3 to 5 days at which time a quantity of water equal to the initial quantity of water should be added.

Within 4 to 48 hours after the addition of the second quantity of water, the mixture should begin to have a definite green appearance. At this time, additional quantities of water equal to the initial quantity may be added until the tank is full. With each addition of water, about one part of serum to 1,000 parts of water is preferably added.

In addition to nutrients, as is understood in the art, the culture should be exposed to adequate light and maintained at a moderate temperature in order to maximize photosynthetic action. An adequate supply of carbon dioxide is required. Good dense cultures suitable for harvesting are typically obtained in about 8–10 days when cultured at a temperature of about 25°C when exposed to artificial light having an intensity of at least 400 foot-candles at surface of the pool. Preferably, the culture pool is agitated to insure that as culture density increases, all of the culture is exposed to adequate light. 5% carbon dioxide in air may also be bubbled through the mass.

Although other sources of artificial light or even natural sunlight will produce satisfactory results, it is preferred to use a quartz iodide lamp provided with a red filter, which absorbs the high frequency red and infrared light. The filtering of the light in the infrared range is important in that it prevents the warming up of the culture by the light source. When adequate illumination is provided, it is preferred that the temperature be maintained at about 20°C and no higher than about 30°C. Maximum growth rate has been found to take place at about 25°C. At temperatures above 30°C, the environment is more favorable to organisms other than chlorella. Substantially no growth takes place below about 15°C.

Cultures grown in accordance with the above techniques, grow in logarithmic fashion for a period of time which may in a typical case range from about 5 to more than 10 days. During this phase, rapid cell division takes place. As the culture continues to increase in density, as determined by the number of cells but later on also by cell size, the rate of progression slacks off and growth enters a stationary phase due usually to depletion of nutrient in the culture solution and the inability of light to penetrate the medium. The length of the exponential phase can be extended somewhat by the supplemental addition of serum and by optimizing the amount of light, carbon dioxide and temperature as discussed above. When cultures are grown on a serum base with adequate light and optimum temperature and $CO_2$, densities of $10^7$ to $10^8$ or even higher are obtained before growth slacks off.

Throughout the logarithmic phase of growth the pH of the mixture should rise because of the chemistry of photosynthesis. A pH in the range of about 8.3 to about 9.5 indicates a healthy culture suitable for use. If the product is going to be stored prior to use, it should have a pH of 9.5 or above, which tends to discourage the growth of bacteria which destroy the flocculating effect of the product.

We have discovered that algal products having unique soil conditioning, plant growth regulating, and also water treatment properties are obtained by harvesting cultures grown in the above-described manner when the cultures are growing in a logarithmic fashion and preferably by harvesting the cultures during the late logarithmic phase of growth, before the stationary phase of growth begins. When harvested during the logarithmic stages of growth it has been determined that the algae cultures have two beneficial properties. During the logarithmic phase of growth the algae produces a plant growth regulating substance. Although the substance has not been fully identified, it has been determined that an auxin-like activity exists in the cultures at this stage. The auxin has not been identified, the growth promoting characteristics of auxins are observed when seedlings are treated with algae cultures as herein disclosed.

It has also been observed that the algae cultures harvested as herein described or the metabolites are flocculants and as such are useful in waste water treatments and further promote and maintain aggregation of soil particles which contributes to improved soil structure, improving water drainage, aeration, tilth, thereby providing conditions more favorable to plant growth. Although the algal product producing aggregation has not been fully identified, an infrared spectrum analysis indicates a high molecular weight polymer, probably a polysaccharide. In any event, aggregation of soil particles has been observed when suspensions of particles are treated with algae cultures and with filtrates of cultures.

When the product is used for soil conditioning, as indicated above preferred technique is to harvest the cultures during the logarithmic phase of growth and preferably during the late logarithmic phase. The significance of this is that auxin-like effects of the product are observed relatively early in the life of the culture and become more pronounced as the culture continues growth in logarithmic fashion, and especially after a culture has reached a density of about $1 \times 10^5$ cells/ml. Although the reasons are not fully understood, it has been observed that the growth regulating properties drop off rapidly once a culture reaches the stationary phase of growth thereby reducing the effectiveness of the product as a growth regulator during this phase of its development. Further it has been observed that no appreciable soil aggregating effect is noted when using cultures which are harvested during early stages of growth. These properties increase appreciably as the culture matures and when the cultures are harvested during the late logarithmic stages of growth a product having an optimum combination of growth regulating and aggregating properties is obtained.

In accordance with one mode of soil treatment with algal products prepared in accordance with the invention, algae are harvested from nurse pools when cell density is at least $1 \times 10^6$ cells/ml. This culture is then added to pools at a point of use about two days prior to use in ratio of one part culture to nine parts water, in addition about one part serum to 1,000 parts of the above-described mixture is added to the pool as a nutrient supplement. At the end of about two days, when exposed to artificial light or sunlight, this pool should have about 4 to $5 \times 10^5$ cells/ml and in any event between about $10^5$ and $10^6$ cells per ml and may be applied to soil at a dosage rate of about 35 gallons per acre of soil to be treated by any suitable means.

Although the above method of the invention achieves the soil treatment and plant growth promoting effects of the invention, it is preferred that cultures be harvested when the culture density reaches $10^7$ cells/ml or higher. When such relatively dense cultures are to be employed, it is important to proportionately reduce the dosage specified above. It is also critical that the cells be harvested in the late logarithmic phase of cell division. The advantages afforded by growth of cultures so that the cell density is above about $10^7$ cells/ml arises because of the appreciable reduction in the amount of product needed to achieve optimum effect. For example, when culture density reaches $10^7$ cells/ml the dosage can be reduced by a factor of 10 so that the same treatment effects as are achieved with 35 gallons per acre can be achieved with about 3½ gallons per acre. Dosages in terms of cell count should range from about $1.1 \times 10^{10}$ to $1.5 \times 10^{11}$ cells/acre. Spraying the product on the field by aircraft, or shipping in smaller containers, and the like are greatly facilitated.

Cell population counts of cultures in the pools may be made by microscopic methods or estimated reliably by colorimetric analysis.

Thirty-six plots, each 9 meters square arranged in a $6 \times 6$ Latin square, were employed to evaluate the effect of the product on '5301 H' sugar beet (*Beta vulgaris L.*) and '659 Mesa' lettuce (*Lactuca sativa L.*) seedling emergence. Each plot consisted of 8 beds spaced approximately 1 meter apart. All plots received a preplant irrigation on day 1, by pumping water through each of two parallel 6 inch lines. Phytoplankton culture having a density of about $10^5$ cells/ml was metered into one of the two lines at a rate producing a dosage equivalent to 35 gallons per acre and designated plots were treated. Flat beds, 0.35 m across, were formed 27 days later. Lettuce and sugar beet seeds were planted in their respective beds (two rows per bed) with a "Planet Junior" hand planter. Four beds in each plot were planted in lettuce and four in sugar beets. The approximate number of seeds planted was determined by weight. The number of sugar beet seeds planted ranged from 941 to 1183 per 36 meters of row. A weight-determined determined average of 539 lettuce seeds per plot (36 meters of row) was planted. On day 29, 4900 liters (2.3 acre inches) of water or water containing $10^5$ cells/ml of phytoplankton culture were metered into each plot. Irrigation as previously described was carried out on day 35. The number of sugar beet seedlings in the center two beds was counted on day 40. One day later the plots received approximately 2 inches of rain. The lettuce stand count in each row of each bed was made on the 47th day.

The lettuce was thinned to a spacing of 25 cm. between plants. All the heads of lettuce from all four beds were harvested and weighed on two dates as they matured. Sugar beets were harvested 20 feet from each of the center two beds of each plot and analyzed for sugar.

The emergence of sugar beet and lettuce seedlings was significantly increased by the addition of phytoplankton culture to test plots (Table I). Analysis of variance of sugar beet and lettuce data gave F values between treatments which were significant at the 1.0 and 7.0 percent levels respectively. The most striking increases were obtained when phytoplankton culture was added in three successive irrigations. Comparison of treatments by Duncan's Multiple Range Test are also given in Table I. Lettuce yields were statistically significantly different (Table II). The differences between the various periods and frequencies of phytoplankton treatment were not statistically significant. The beet yield was significantly increased by treatments with the phytoplankton culture.

TABLE I

EFFECT OF AQUEOUS PHYTOPLANKTON CULTURE $10^5$ CELLS/ML ON
SEEDLING EMERGENCE OF LETTUCE AND SUGAR BEETS IN FIELD PLOTS

| Treatments | Lettuce* | Sugar Beets** |
|---|---|---|
| | percent emergence | |
| Control | 38.0 a | 48.8 a |
| Culture added to pre-plant irrigation only | 46.8 ab | 54.9 b |
| Culture added to germination irrigations only | 48.1 ab | 56.6 b |
| Culture added to germination irrigations and all following | 54.3 ab | 58.4 b |
| Culture added to pre-plant and germination irrigations | 52.7 ab | 59.0 b |
| Culture added to all three irrigations | 57.8 b | 60.4 b |

Numbers are means of six plots.
*The F Value between treatments was significant at the 7% level.
Means in a column followed by the same letter are not significantly different at the 5% probability level by Duncan's Multiple Range Test.
**The F Value between treatments was significant at the 1% level.

TABLE II

EFFECT OF AQUEOUS PHYTOPLANKTON CULTURE ($10^5$ CELLS/ML)
ON YIELD OF LETTUCE AND SUGAR BEETS IN FIELD PLOTS

| | Lettuce* Kg./100 m. | Sugar Beets T/Ha. |
|---|---|---|
| Control | 7.62 | 8.68 |
| Culture added to pre-plant irrigation only | 8.44 | 9.33 |
| Culture added to germination irrigations only | 8.11 | 8.82 |
| Culture added to germination irrigations and all following | 8.60 | 9.05 |
| Culture added to pre-plant and germination irrigations | 8.91 | 9.11 |
| Culture added to all irrigations | 8.45 | 9.06 |

*The F value between treatments was significant at the 5% level.

All yields are the averages of six plots. Lettuce was harvested over a total of 72 meters of row. Beets were harvested over a total of 24 meters of row.

In sewage treatment applications the product should be applied in amounts of one part per thousand when cell density is between $10^5$ to $10^6$ cells/ml. At higher cell counts dosage may be proportionately reduced.

Preferably, the product is applied to the sewage when it is still in an aerobic condition, and when this is done odor is most effectively controlled and volatilization of hydrogen sulfide is minimized. Application of the product to anaerobic sewage, including digester sludge, is also effective in odor control.

In usage of the product wherein auxin activity is important, extremes of temperature between harvesting and use should be avoided. It is also important that the product be stored in dark containers following harvesting, if storage is desirable, as some auxins are light sensitive.

It should be noted that although the preferred method of usage of the cultures is by application of the cultures in the aqueous medium in which they are suspended, filtrates of the cultures have been observed to exhibit the flocculating and plant growth promoting effects referred to herein and if desirable the harvesting step may further include the filtration of the cellular substance so that the extracellular materials are available for use.

We claim:

1. A method of producing algal products having properties useful for the treatment of material such as soil and waste water which comprises culturing green algae in an aqueous nutrient medium in the presence of light and carbon dioxide and at a temperature of between about 20°C and about 30°C, harvesting the culture before the end of logarithmic growth after the population density of the cells is at least $10^5$ cells per milliliter and applying the harvested culture to the material to be treated.

2. A method according to claim 1 in which the material to be treated is soil.

3. A method according to claim 2 wherein the dosage rate is between about $1.1 \times 10^{10}$ and $1.5 \times 10^{11}$ cells/acre.

4. A method according to claim 1, further comprising shielding the harvested culture from light until use.

5. A method according to claim 1 wherein the material to be treated is waste water.

6. A method according to claim 5 wherein the product is applied when the waste water is in an aerobic condition.

7. A method according to claim 5 wherein the dosage rate is about 1 part per 1,000 parts.

8. A method according to claim 1 wherein the culture is harvested when the cell count exceeds $10^7$ cells per milliliter.

9. A method according to claim 1 wherein the algae is *Chlorella pyrenoidosa*.

10. A method of producing products having properties useful for the treatment of material such as soil and waste water which comprises culturing Chlorella in an aqueous nutrient medium in the presence of light and carbon dioxide, and at moderate temperatures, harvesting the culture during the logarithmic stage of growth when the population density reaches at least $10^5$ cells per milliliter, transferring a portion of the culture to a pool at the site of use and adding the culture to the pool until the population density of the pool is at least $5 \times 10^4$ cells per milliliter, adding nutrient supplement to the pool harvesting the culture when the cell density reaches at least $10^5$ cells per milliliter and applying the harvested culture to the material to be treated.

* * * * *